Figure 1:
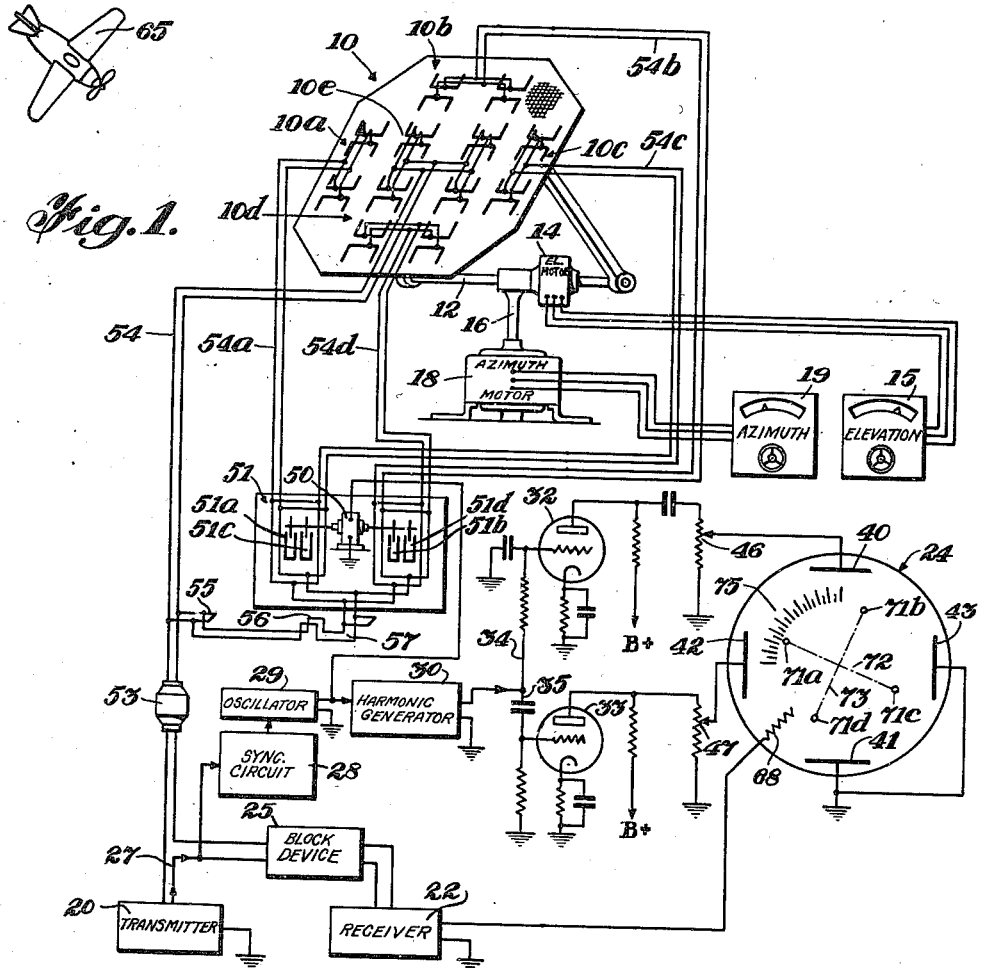

April 29, 1947.   E. LABIN   2,419,567
RADIO DETECTION SYSTEM
Filed Feb. 27, 1943   2 Sheets-Sheet 1

INVENTOR.
EMILE LABIN
BY Lucy P. Lantry
ATTORNEY

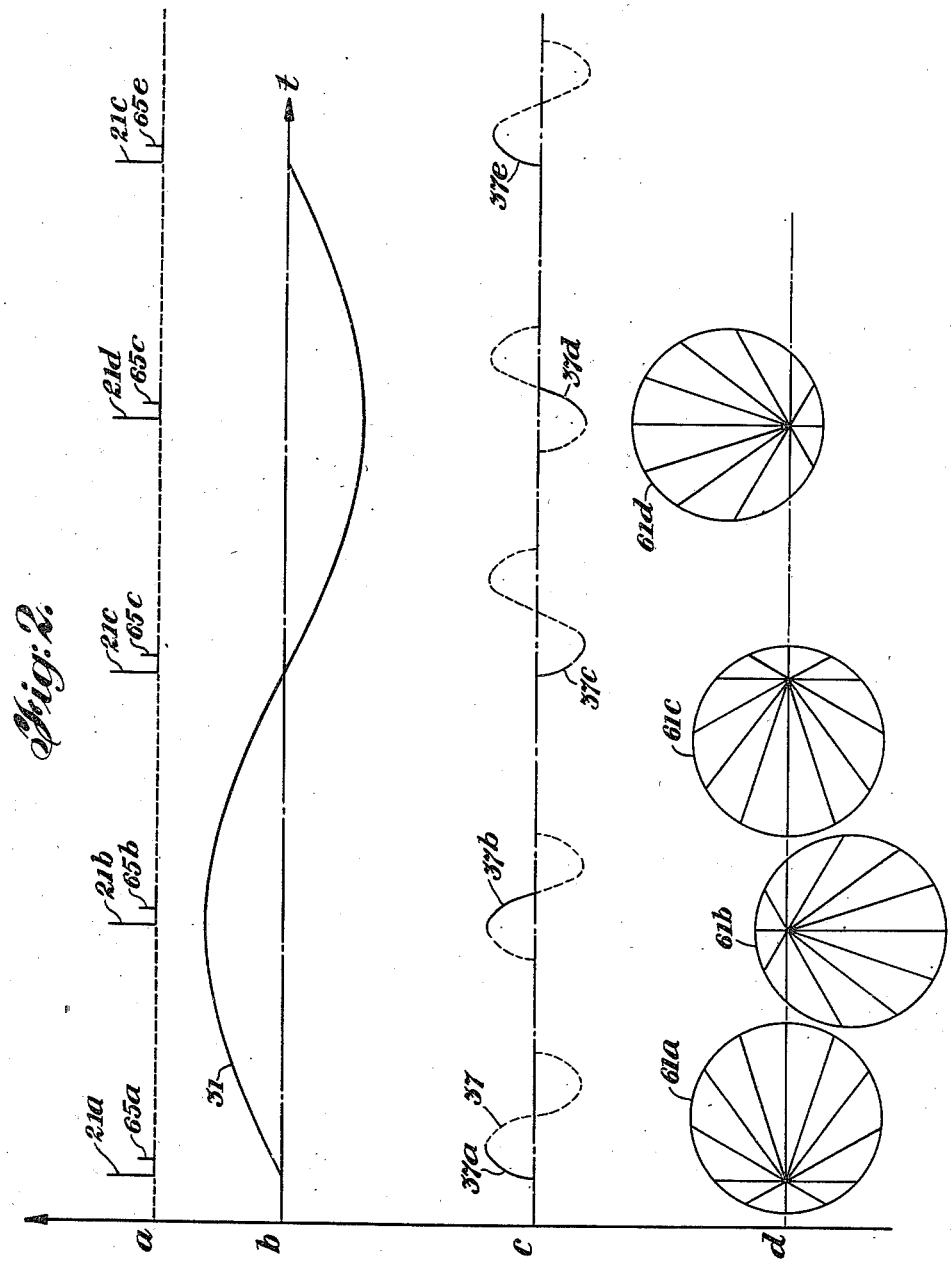

Patented Apr. 29, 1947

2,419,567

UNITED STATES PATENT OFFICE 2,419,567

RADIO DETECTION SYSTEM

Emile Labin, New York, N. Y., assignor to Federal Telephone and Radio Corporation, Newark, N. J., a corporation of Delaware Application February 27, 1943, Serial No. 477,352

16 Claims. (Cl. 250—1.62)

This invention relates to radio detection systems and more particularly to the direction finding and indicating features of such systems.

One of the objects of this invention is to provide a radio detection system using a single cathode ray oscillograph to obtain indications of range, azimuth and elevation of an obstacle such as an aircraft.

Another object of this invention is to provide an antenna and indicating arrangement for determining the direction to a source of received pulses or the point of reflection of pulses should the pulses received be reflected by some obstacle.

According to my invention, I use as a directional antenna such as of the form disclosed in the copending application of A. Kandoian entitled "Directive antenna array," Serial No. 457,543, filed September 7, 1942. The antenna comprises several units together with a synchronous director which directs the transmitted and/or received power successively in a plurality of directions such, for example, as four different directions at right angles corresponding to left, right, up and down. When used for radio detection purposes, in accordance with my invention, impulses are transmitted and the echo pulses caused by obstacles in response to transmitted impulses are received successively in the four radiation patterns provided by the antenna and synchronous director arrangement. When the corresponding echo received in these four radiation patterns are all equal, as indicated on an oscillograph, the axis of the antenna is then aimed toward the reflecting object.

For indication purposes, I provide a single cathode ray oscillograph having preferably a circular time base synchronized with the movement of the synchronized director in such a manner that indications at each extremity of two perpendicular diameters will represent the corresponding echo pulses received in the four radiation patterns. This indication is accomplished by normally biasing the grid of the cathode ray tube so as to black out the beam thereof. When echo pulses are received, the pulses increase the intensity of the beam so as to provide spots on the screen of the cathode ray tube. These spots appear for the echo pulses of a particular obstacle at the extremities of two perpendicular diameters on the screen of the oscillograph. The screen of the cathode ray tube may be calibrated so that the position of one of the spots with respect to a given point on the calibrated screen will give the range of the obstacle. The direction to the obstacle as determined by azimuth and elevation is determined by the angular position of the axis of the antenna when the four spots are of the same brilliance. That is to say, when the two spots on one diameter are of the same brilliance the axis of the antenna is adjusted correctly with respect to the obstacle in one plane of reference, such as in the horizontal, and when the other two spots on the other diameter are of equal brilliance the position of the axis of the antenna is adjusted correctly with respect to the obstacle in the second or vertical plane of reference. Thus, by using a single cathode ray tube with a directive antenna I am able to obtain simultaneously the range, azimuth and elevation of the obstacle.

Figure 3:
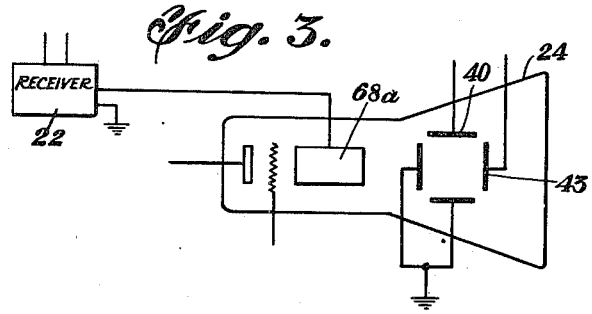

For a further understanding of the invention, reference may be had to the following detailed description to be read in connection with the accompanying drawings, in which:

Fig. 1 is a schematic wiring diagram of a radio detection system in accordance with my invention, Fig. 2 is a graphical illustration of the operation thereof, Fig. 3 is a fragmentary view of an alternative form of oscillograph control that may be used in the system of Fig. 1.

Referring to Fig. 1, I show a dipole antenna array 10 mounted on a horizontal shaft 12 by which the antenna may be moved in a vertical plane by a motor 14. The shaft 12 is mounted on a vertical standard 16 the position of which is controlled by a motor 18. The motors 14 and 18 are controlled by elevation and azimuth indicating devices 15 and 19. The devices 15 and 19 may be of any suitable character whereby manipulation controls the angular position of the respective motor and at the same time indicates such position.

The antennae 10 may be of any form capable of providing a rotating radiation pattern. I have shown for purposes of illustration a directional antenna of the aforementioned copending application of A. Kandoian for scanning successively in a plurality of steps a radiation pattern, the beam axis of which is disposed at a slight angle to the axis of the antenna. This antenna is constructed in a dipole array of antenna units linearly arranged in coupled pairs in two series disposed at right angles to each other, the center unit of each series being common to the other. The units of each series are spaced apart in a line and are fed in even phase with currents which are proportional to the coefficients of a binomial expansion so as to give a directive radiation pattern. For more details of the directive characteristics of the antenna reference may be had to the aforementioned copending application of A. Kandoian.

For radio detection purposes, I provide in connection with the antenna units, a transmitter 20 by which impulses may be transmitted and a receiver 22, together with an oscillograph 24 by which echo pulses produced by an obstacle in response to the transmitted impulse are indicated. The receiver is blocked by a blocking device 25 during the transmission of the impulses. To synchronize the transmitter, receiver and oscillograph with the rotating radiation pattern of the directive antennae 10, I provide the oscillograph 24 with a circular time base which I synchronize with the transmitter 20 by synchronizing pulses received therefrom over connection 27. These synchronizing pulses are first applied to a synchronizing circuit 28 which may comprise a known multi-vibrator and differentiating circuit, so as to produce a controlling pulse for every fourth transmitted impulse. These controlling pulses determine by known means the period of an alternating current 31 (curve b, Fig. 2) produced by an oscillator 29.

In Fig. 2, the synchronizing operation is shown graphically. Assuming that the impulses 21a, 21b, 21c and 21d of curve a comprise one series of four impulses transmitted by the transmitter 20, the alternating current 31 of the oscillator 29 may be regarded as synchronized with these pulses in the relation shown. The current 31 is used to drive the motor 50 of a synchronous director 51, to be hereinafter described, which controls the rotation of the radiation pattern of the antennae 10. It will be understood, however, that the same source of power that is used for the transmitter may be used in the place of the current 31 to drive the motor 50. The impulses 21a etc. would in such case by synchronized with the same source of power so as to provide the desired relationship with the rotating radiation.

The time base for the oscillograph 24 is produced from an oscillating current of much higher frequency than the current 31 or such other current that may be used to drive the motor 50. This higher frequency provides a rapid sweep sufficient to cover the maximum effective range of the system in one quarter or 90° of the circular time base of the oscillograph. This relationship gives a sweep portion which may be calibrated and used in connection with one of the quadrants of the rotating radiation to give an indication of distance to an obstacle upon which the antennae are focused. To insure this relation between the rotation feature of the series of four impulses and the sweeps of the cathode ray beam, the frequency of the sweep voltage should be one quarter of a cycle greater than a multiple of the frequency of impulse transmission.

This sweep voltage is produced by applying the alternating current 31 to a harmonic generator 30 from which a harmonic of the desired frequency is selected. This harmonic oscillation 37 which I have represented by the fragmentary wave portions in curve c, Fig. 2, is applied to a sweep circuit having vacuum tubes 32 and 33. The illustration of the harmonic oscillation 37 is exaggerated with respect to the wave 31 of curve d so as to indicate the relation thereof with respect to curve a. It will be understood of course, that the frequency of the oscillations 37 is many many times the frequency of the wave 31. The oscillations 37 are applied to the grids of these tubes through phase splitting circuits 34 and 35, respectively. These circuits have time constants such that the current of the oscillations is caused to lag when applied to the tube 32 and to lead when applied to the tube 33. The plate output of the tube 32 is applied across the vertical deflection electrodes 40 and 41 and the plate output of the tube 33 is applied to the horizontal deflection electrodes 42 and 43. The deflection circuit is further provided with variable resistors 46 and 47 by which the circular time base may be adjusted relative to the vertical and horizontal directions on the screen of the oscillograph.

As hereinafter stated, the current 31 is used to drive the motor 50 of a synchronous director 51 which controls the transfer of energy to the four outer antenna units 10a, 10b, 10c and 10d. Energy is transferred between the central unit 10e and the transmitter 20 and receiver 22 over transmission line 54, which includes a rotary coupling unit 53. Energy is transferred over a power divider network 55, phase shifter 56 and transmission line 57 through the synchronous director 51 to the outer antenna units 10a, 10b, 10c and 10d. The synchronous director 51 is provided with individual switching units 51a, 51b, 51c and 51d for control of the transmission lines 54a, 54b, 54c and 54d to the antenna units 10a, 10b, 10c, and 10d, respectively.

These switching units 51a to 51d are preferably of the character described in the Andrew Alford Patent #2,259,510, entitled "Coupling arrangements for high frequency transmission systems," granted October 21, 1941. When these units are tuned to resonance they serve substantially as a cut-off filter, but when detuned slightly from resonance they have substantially no effect on the transmission of energy through the lines associated therewith. Each of the switching units is provided with a condenser element driven by the motor 50. These switching elements are preferably designed for the present system so that each switching unit provides an effective blocking of the associated line for three-quarters of a period of the oscillation 31, curve b, Fig. 2. These condenser elements to provide this three-quarter period blocking may comprise a circular disc with one-quarter segment removed. The arrangement of the several condenser elements is such that the transmission lines to the antenna units 10a, 10b, 10c and 10d are successively rendered conductive so as to transfer successively energy to or from the antenna units.

It will be understood, of course, that each radiating pattern may be produced by two adjacent antenna units, together with the center unit 10e instead of one outer unit with the center unit as described above. In this case, however, the patterns will be shifted about the axis of the antenna 45 degrees.

Referring to curve d of Fig. 2, the radiation pattern of the antennae 10 is controlled by the transfer control of the synchronous director 51 so as to provide successively shifted radiation patterns 61a, 61b, 61c and 61d for certain periodic cycles of oscillation 37. These patterns are shown as horizontal cross sections of the beams as produced by the antennae when directed upwardly into the sky. During the first radiation 61a an impulse 21a is transmitted and an echo pulse 65a is caused by an obstacle 65 upon which the system is focused. This transmission of an impulse is repeated for each of the successive radiations 61b, 61c and 61d. Since the maximum effective range of the systems is covered by 90° of a cycle of the harmonic 37, the parts 37a etc. which correspond to the detection interval following the impulses 21a etc. respectively correspond to the successive quadrants of the circular sweep.

The echo pulses 65a, etc. are applied from the receiver 22 to one or more of the beam control electrodes 68 of the cathode ray tube 24. That is to say, the echo pulses may be applied to either the intensity controlling grid 68, Fig. 1, or the focusing electrode 68a, Fig. 3, of the cathode ray tube or both. The intensity electrode controls the brilliance of the beam indication on the screen while the focusing control electrode controls the size of the beam at the screen. The cathode ray tube is normally biased so as to black out the beam so that when an echo pulse is applied to the control 68 the beam is caused to illuminate the screen, thereby giving a spot indication. Since the pulses are successively received over the antenna units in a time relation along the period of the circular time base, four spot indications 71a, 71b, 71c and 71d will appear. The spots 71a and 71c are located at the extremities of a diametrical line 72 and the spots 71b and 71d are located at the extremities of a diametrical line 73, the lines 72 and 73 being at right angles. The spots 71a and 71c correspond to the radiation reception caused by the antenna units 10a and 10c. When the antenna 10 is so manipulated by the controls 15 and 19 that the spots 71a and 71c are of equal intensity and/or size, the azimuth indication at the control 19 will be the azimuth of the obstacle 65. Likewise, when the spots 71b and 71d are equal in intensity and/or size, the indication of elevation at the control 15 will be the elevation of the obstacle 65.

The screen of the oscillograph 24 is preferably calibrated as at 75 according to distance or time, so that the position of the spot 71a with respect to the calibration will give the distance to the obstacle 65.

While I have shown the principles of my invention in connection with a specific apparatus, I recognize that many variations and alterations as well as different applications thereof may be made without departing from the invention. For example, the system may be arranged to indicate the direction to a source of pulses transmitted by enemy craft or stations, as well as the locations of pulse reflecting obstacles. It is to be understood, therefore, that the system as herein described and illustrated is given by way of illustration only, and not as limiting the objects of the invention.

I claim:

1. A radio detection system having directional antennae for scanning successively a radiation pattern over predetermined angles relative to the axis of the antennae, an impulse transmitter, a receiver, means for synchronizing said transmitter and receiver with said scanning antennae so as to transmit an impulse over the antennae while the radiation pattern is at each of said predetermined angles with a predetermined time interval thereafter for reception of reflection pulses caused by obstacles in response to said impulse, an oscillograph, means to apply the reflection pulses to said oscillograph to produce thereon a separate indication for reflection pulses received during the different scanning angles, and means to change the scanning position of the antennae until the indications are of the same quality for a particular obstacle, the axial position of the antennae for equal quality of indications giving the direction to said obstacle.

2. The system defined in claim 1 wherein the oscillograph has a calibration on the screen thereof and the distance to the position of one of the reflection indications with respect to a given point on said calibration represents the distance to said obstacle.

3. The system defined in claim 1 wherein the antennae includes means to effect a radiation scanning over two different angles of radiation in a horizontal plane of reference so that when the reflection indications received during these two angular radiations are of equal quality the axial position of the antennae will give the azimuth of said obstacle.

4. The system defined in claim 1 wherein the antennae includes means to effect a radiation scanning over two different angles of radiation in a vertical plane of reference so that when the reflection indications received during these two angular radiations are of equal quality, the position of the antennae will give the elevation of said obstacle.

5. The system defined in claim 1 wherein the antennae includes means to effect a radiation scanning over four different angles of radiation two in a horizontal plane of reference and two in a vertical plane of reference so that when the reflection indications received during these angular radiations are of equal quality the axial position of the antennae will give the azimuth and elevation of said obstacle.

6. The system defined in claim 1 wherein the antennae includes means to effect a radiation scanning over four different radiation angles two in a horizontal plane of reference and two in a vertical plane of reference so that when the reflection indications received during these angular radiations are of equal quality, the axial position of the antennae will give the azimuth and elevation of said obstacle, and the oscillograph includes means providing a calibration so that the distance to the position of one of the reflection indications with respect to a given point on the calibrations represents the distance to said obstacle.

7. The system defined in claim 1 wherein the oscillograph is provided with a sweep circuit arranged to produce a desired time base, and the means for applying the reflection pulses to said oscillograph comprises means to control the intensity of the beam thereof so as to produce spot indications spaced along said time base in accordance with the reception of said reflection indications, the spot indications corresponding in brilliance to the strength of the respective reflection pulses.

8. The system defined in claim 1 wherein the oscillograph is provided with a sweep circuit arranged to produce a circular time base, and the means for applying the reflection pulses to said oscillograph comprises means to control the focus of the beam thereof so as to produce a spot indication spaced along said time base in accordance with the reception of said reflection indications, the spot indications corresponding in size and brilliance to the strength of the respective reflection pulses.

9. The system defined in claim 1 wherein the antennae includes means to effect a radiation scanning successively over four different angles of radiation two in a horizontal plane of reference and two in a vertical plane of reference, and the oscillograph is provided with a sweep circuit arranged to produce a circular time base, the circular sweeps of which are one-quarter of a cycle greater than the frequency of impulse transmission, and the means for applying the reflection pulses to said oscillograph comprises means to control the intensity of the beam on the screen thereof so as to produce spot indications spaced substantially 90° apart along said time base, the spot indications corresponding in brilliance in accordance with the strength of the respective reflection pulses.

10. A direction indicating system having directional antennae for scanning successively a radiation pattern over predetermined angles relative to the axis of the antennae to determine the direction to a source of pulses, an oscillograph normally biased to non-indicating condition and connected to produce indications on the screen when energy is applied to its control element, said indications varying in strength in accordance with the energy applied, means to synchronize the time base of the oscillograph with the scanning of the different angles of radiation, means to receive pulse energy picked up by the antennae in each of the different radiation angles, means to apply the pulse energy received from each of the different radiation angles to the control element of the oscillograph so as to produce a plurality of spot indications on the screen of said oscillograph each in accordance with the strength of the pulses received in one of the different radiation angles, and means to change the scanning position of the antennae until the spot indications are of substantially equal quality, whereby the position of the axis of the antennae indicates the direction to the source of said pulses.

11. The system defined in claim 10, wherein the antennae includes means to effect a radiation scanning over two different angles of radiation in a horizontal plane of reference so that when the spot indications of the pulses received during these two radiations are of equal quality the axial position of the antennae will indicate the azimuth of the source of said pulses.

12. The system defined in claim 10 wherein the antennae includes means to effect a radiation scanning two different angles of radiation in a vertical plane of reference so that when the indications of the pulses received during these two radiations are of equal quality the axial position of the antennae will indicate the elevation of the source of said pulses.

13. The system defined in claim 10 wherein the antennae includes means to effect a radiation scanning over four different angles of radiation, two in a horizontal plane of reference, and two in a vertical plane of reference so that when the indications of the pulses received during these radiations are of equal quality the axial position of the antennae will indicate the azimuth and elevation of the source of said pulses.

14. The system defined in claim 10 wherein the oscillograph is provided with a sweep circuit arranged to produce a circular time base, and the means for applying the pulses to said oscillograph comprises means to control the intensity of the beam on the screen of the oscillograph so as to produce spot indications along said time base, the spot indications corresponding in brilliance to the strength of the respective pulses received in different angles of radiation.

15. The system defined in claim 10 wherein the oscillograph is provided with a sweep circuit arranged to provide a circular time base, and the means for applying the pulses to said oscillograph comprises means to control the focus of the beam thereof so as to produce spot indications along said time base, the spot indication corresponding in size and brilliance to the strength of the respective pulses received in the different angles of radiation.

16. A radio detection system having directional antennae for scanning successively a radiation pattern over predetermined radiation areas, an impulse transmitter, a receiver, means for synchronizing said transmitter and receiver with said scanning antennae so as to transmit an impulse over the antennae while the radiation pattern covers each of said radiation areas with a predetermined time interval thereafter for reception of reflection pulses caused by obstacles in response to said impulse, an indicator, means to apply the reflection pulses to said indicator to produce thereon a separate indication for reflection pulses received during the scanning of the different areas, and means to change the scanning position of the antennae until the indications are of the same quality for a particular obstacle.

EMILE LABIN.

REFERENCES CITED

The following references are of record in the file of this patent:

UNITED STATES PATENTS

| Number | Name | Date |
| --- | --- | --- |
| 2,231,929 | Lyman | Feb. 18, 1941 |
| 2,189,549 | Hershberger | Feb. 6, 1940 |

FOREIGN PATENTS

| Number | Country | Date |
| --- | --- | --- |
| 526,658 | British | Sept. 23, 1940 |